United States Patent [19]

Ellerbroek et al.

[11] Patent Number: 4,705,400
[45] Date of Patent: Nov. 10, 1987

[54] SHEARING PHASE DIFFERENCE SENSOR

[75] Inventors: Brent L. Ellerbroek, Los Angeles; Brian D. Cohn, El Segundo, both of Calif.

[73] Assignee: Hughes Aircraft Company, Los Angeles, Calif.

[21] Appl. No.: 806,893

[22] Filed: Dec. 9, 1985

[51] Int. Cl.[4] .............................................. G01B 9/02
[52] U.S. Cl. .................................... 356/353; 356/354
[58] Field of Search ............... 356/353, 354, 355, 356, 356/359, 360

[56] References Cited

PUBLICATIONS

Heushaw et al., "Multiple-Order Radial-Grating Shearing Interferometer", *Applied Optics*, vol. 21, No. 10, pp. 1772–1777, 5/82.

*Primary Examiner*—Davis L. Willis
*Assistant Examiner*—Matthew W. Koren
*Attorney, Agent, or Firm*—Ronald L. Taylor; A. W. Karambelas

[57] ABSTRACT

A shearing phase difference sensor including a high energy laser source for generating adjacent coherent light beam. Samples of the beams are extracted by an extracter and directed to an optical modifier. The optical modifier, positioned for intercepting the sample beams from the extracter, diffracts the beams and produces output beams which, in turn, are directed through a lens to a detector. The detector, positioned to intercept the output beams, produces electrical signals indicative of the output beams. The electrical signals are processed by a processor which calculates the phase difference between adjacent coherent light beams. Also, disclosed is a method for measuring the phase difference between adjacent coherent light beams.

19 Claims, 4 Drawing Figures

SHEARING PHASE DIFFERENCE SENSOR

GOVERNMENT RIGHTS IN INVENTION

The Government of the United States of America has rights in this invention pursuant to a government contract.

BACKGROUND OF THE INVENTION

The present invention relates to lasers and, more particularly, to a system for determining the phase difference between mutually coherent light beams. Still further, the invention relates to synthetic aperture or phased array laser transmitters and an apparatus and method for determining whether adjacent transmitters are properly aimed and aligned.

In directing or receiving several coherent high energy laser light beams using synthetic aperture or phased array techniques, it is important to have all of the beams in phase. When using segmented mirrors, in far-term large aperture space sensors, for example, it is important that each segment or sub-assembly mirror be properly aligned to insure that the beams reflected from the mirror are in phase and directed to the proper focal point. Phased array laser transmitters have similar requirements. Proper alignment is accomplished by independent adjustment of each sub-assembly mirror and enables the segmented mirrors to perform as a single unit. Thus, proper alignment insures that each segmented mirror directs its beam in phase with the others for maximum intensity.

In such systems, a means is needed to determine whether or not the coherent beams are in phase and to adjust them if they are not. Optical path difference sensors can be used to determine the phase difference between coherent beams. Once the phase difference is determined between the beams, the beams can be adjusted so that they are in phase. Optical path difference sensors are known for sampling and determining the phase difference between coherent beams. Such sensors include image plane phase difference sensors and multiple order radial-grating shearing interferometers. In practice, these sensors have several disadvantages, some of which are as follows: When laser amplitude varies across the beam being sampled, as is often the case, the accuracy of present sensors suffers. These sensors require periodic calibration of the bias and the responsivity of the detectors to maintain accuracy. In addition, there is a need for sensor line of sight (LOS) stabilization to remain within the detector array field of view. Also, in the multiple order radial-grating shearing interferometer there is a need for a square wave reference signal, which is derived from a rotating square wave grating. Further, these sensors are highly complex and expensive.

Those skilled in the art may be aware of still other disadvantages in the use of the types of optical path difference sensors mentioned herein and common in the field.

SUMMARY OF THE INVENTION

The present invention provides a shearing phase sensor which coherently phases beam trains generated from phased array high energy laser transmitters. Also, the invention provides a shearing phase sensor which monitors the optical alignment of large segmented mirrors which may be used in large aperture space sensors. Further, the invention provides a method for determining the phase difference between adjacent coherent light beams.

Accordingly, a system in accordance with the present invention includes a high energy laser source which generates adjacent coherent light beams. The laser source may comprise several lasers, or one laser having its beam split several times and amplified. An extracter extracts a sample from each adjacent coherent beam and is positioned such that the extracted sample is directed to an optical modifier. The optical modifier diffracts the sample beams to produce at least one output beam. Preferably the optical modifier is a translating grating which diffracts the beam samples into at least three output beams. The output beams are directed to a lens, preferably a collimating lens. The lens is positioned such that the output beams are directed to a detector means. The detector means, preferably three detectors, is positioned for intercepting the output beams from the lens and to produce at least one electrical signal indicative of the output beams. Preferably three signals are produced. A processor, which is responsive to the electrical signals, determines a phase difference between the adjacent coherent light beams.

The present invention, in the absence of noise or higher order phase aberrations, measures precisely the optical phase difference or phase error between two sample beams relative to their average direction of propagation. The laser amplitude, detector biasing, or uniform backgrounds have no effect on the measuring of the phase error between the beams samples. Likewise, detector bias and responsivity calibrations, sensor LOS stabilization, or a square wave reference signal are not needed to determine the phase error between the beam samples. Further, the present invention reduces the minimum necessary peak signal to root mean square noise ratio by a factor of about 7 to 15 which, in turn, relaxes detector and stray light requirements.

Further, the invention includes a method for measuring the phase difference between adjacent coherent light beams having the same frequency. According to the method a sample is extracted from each adjacent coherent light beam. The samples each include first and second ray segments. The ray segments of each sample are optically modified to produce a diffraction pattern which provides first, second, and third output beams. The optical modification includes rotating a translating grating at a predetermined translation velocity. The first output beam is selected, preferably the sum of a diffracted order from the first ray segment of the second beam sample and another diffracted order from the second ray segment of the second beam sample. The second output beam is selected, preferably the sum of a diffracted order from the first ray segment of the second beam sample and another diffracted order from the second ray segment of the first beam sample. The third output beam is selected, preferably the sum of a diffracted order from the second ray segment of the first beam sample and another diffracted order from the first ray segment of the first beam sample. Selection of the output beams is accomplished by positioning a detector means, preferably first, second, and third detectors, to receive the first, second, and third output beams. The first, second, and third detectors detect the output beams and produce first, second, and third modulated electrical signals having amplitude and phase components. The phase components are extracted from the first, second, and third electrical signals to produce first, second, and third phase signals. The phase signals are combined to determine the phase difference between the first and second adjacent beams.

Other advantages of the present invention will become apparent to one skilled in the art upon reading the following specification and by reference to the following drawings:

DETAILED DESCRIPTION OF THE PREFERRED EMBODIMENT

Figure 1:
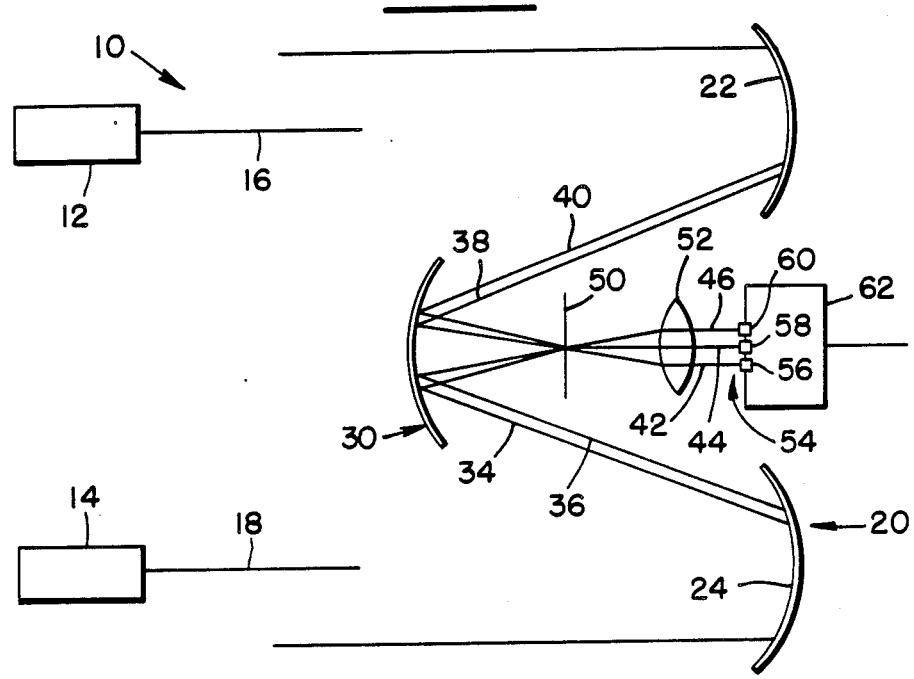
FIG. 1 is a schematic of an adaptive laser system in accordance with the teachings of the present invention.
Figure 2:
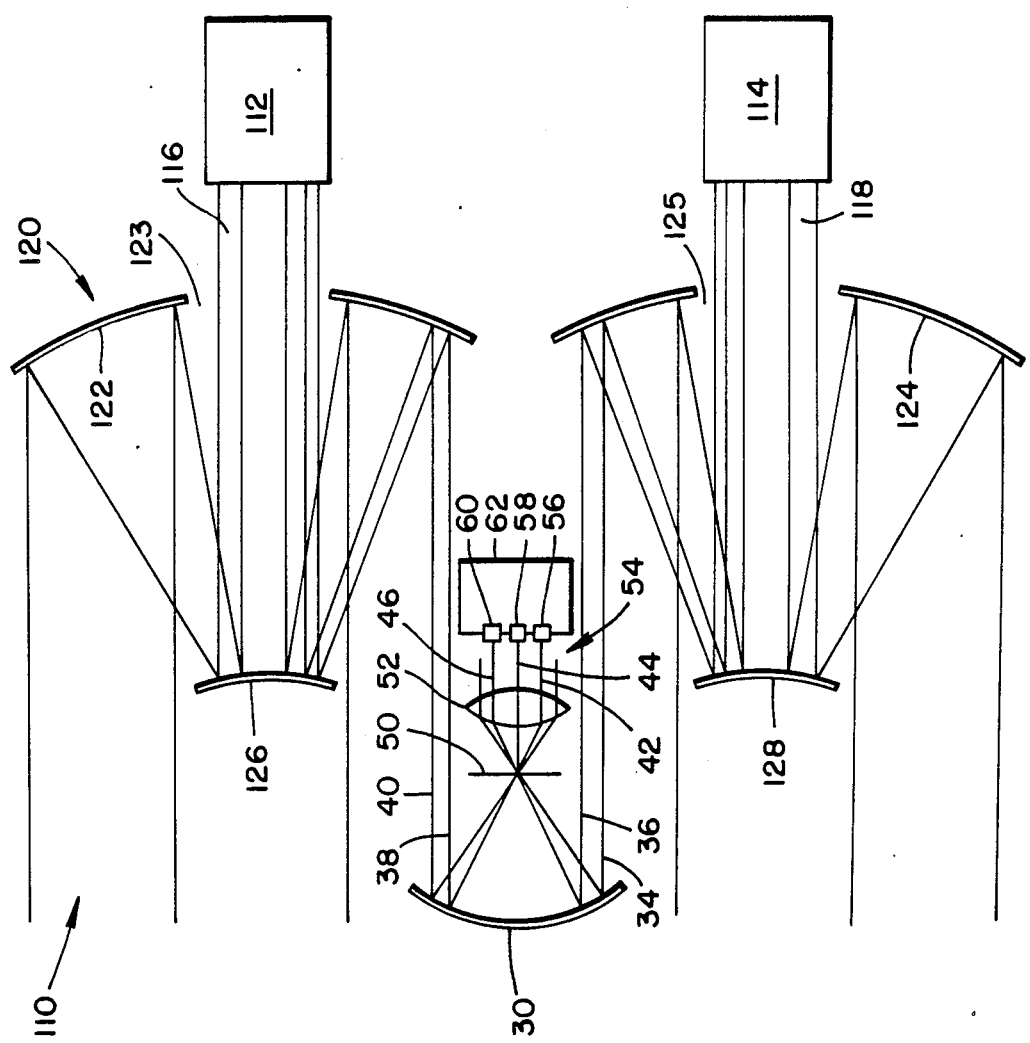
FIG. 2 is a second embodiment of an adaptive laser system in accordance with the teachings of the present invention.
Figure 3:
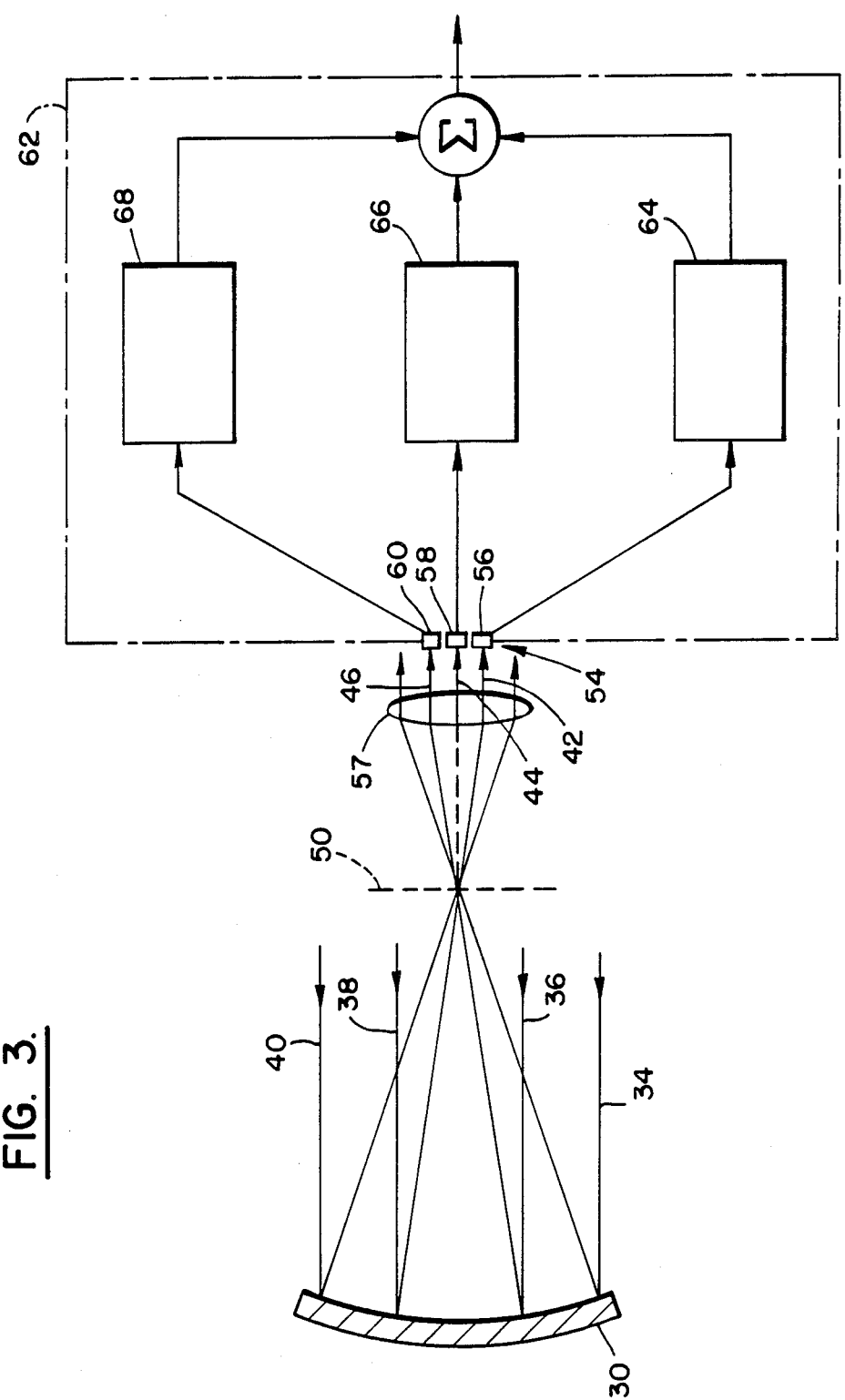
FIG. 3 is an enlarged view of a portion of FIG. 1.

An adaptive laser system, in accordance with the present invention, is illustrated in FIGS. 1 and 2 and is designated by reference numeral 10 and 110, respectively. Referring to FIG. 1, the laser system 10 includes a pair of high energy laser sources 12 and 14. The lasers 12 and 14 produce beams 16 and 18 which are of the same frequency. Also, the system 10 could utilize a single laser (not shown) splitting the beam several times and amplifying it to produce several coherent light beams having the same frequency. FIGS. 1 and 2 illustrate two transmitters 20, 120 from an array of transmitters. The array would normally include several transmitters 20 as described herein. However, for simplicity, two transmitters 20 have been chosen to describe how a phase difference is determined between two or more adjacent transmitters. This calculation applies to the entire array. The beams 16 and 18 are directed to a transmitter 20, preferably an array of adjacent concave mirrors. Generally a focusing means (not shown) may be used to focus the beams 16 and 18 onto the mirrors. For simplicity, two adjacent mirrors 22 and 24 are shown and will be used to describe the principles of the system 10.

In FIG. 2 the system 110 illustrates a pair of laser beams 116 and 118, generated from laser sources 112 and 114 (which may comprise a single source being split into multiple beams) and directed through adjacent transmitters 120. The beams 116 and 118, are projected through openings 123 and 125 in a pair of concave mirrors 122 and 124. The beams 116 and 118 are intercepted by a pair of convex mirrors 126, 128 which direct the beams 116 and 118 onto the transmitting mirrors 122 and 124. The mirrors 122 and 124 may be deformed by expansion and contraction of piezoelectric actuators (not shown), for focusing the beams 116 and 118, in response to commands determined by a data processor or controller. The mirrors 122 and 124 in turn direct the beams 116 and 118 to a predetermined point in space (towards the left as seen in the drawings).

An extracter 30, preferably a concave sampling mirror, is positioned at a predetermined distance between and opposing the array of mirrors 22 and 24 or 122 and 124 to extract samples of the beams 16 and 18 or 116 and 118. Samples from beams 16 and 18, having ray segments 34, 36, 38 and 40, are extracted by the extracter 30. The ray segments 34, 36, 38 and 40, two from the first beam 16 and two from the second beam 18, are directed from the extracting means 30 to an optical modifier 50. The optical modifier 50, preferably a rotating translating grating, is positioned at the focal point of the extracter 30. The optical modifier 50 diffracts the ray segments 34, 36, 38, and 40 into a lens 52. As the ray segments 34, 36, 38 and 40 are diffracted by the optical modifier 50 they are transposed into output beams 42, 44 and 46. The transmittance or transfer function of the optical modifier 50 will be discussed herein.

The lens 52, preferably a collimating lens, is positioned to intercept the three output beams 42, 44, and 46 from the optical modifier 50. The lens 52 directs the three parallel output beams 42, 44 and 46 to a detector means 54.

The detector means 54, preferably three pupil plane detectors 56, 58, and 60, is positioned to intercept the output beams 42, 44, and 46. Generally, the positioning of the detectors 56, 58 and 60 is dependent on the distance between the ray segments 34, 36, 38 and 40. Preferably, the distance between the ray segments 34 and 36 is substantially equal to the distance between the ray segments 38 and 40 and the distance between the ray segments 36 and 38 is approximately equal to twice the distance between ray segments 34 and 36 and 38 and 40. Thus, the detectors 56, 58, and 60 are positioned such that they detect output beams 42, 44, and 46 respectively. The detectors measure the intensity modulations of the output beams which will be discussed herein. The detecting means 54 produces electrical signals indicative of the output beams 42, 44 and 46 which are directed to a processor 62.

The processor 62 could be any conventional means for calculating the phase difference, which will be described herein. Preferably the processor 62 includes three conventional eight bucket correlators 64, 66 and 68 for integrating the signals to determine the phase difference. However, as stated any conventional processing means may be used.

The general operation of the system illustrated in FIGS. 1 and 2 are as follows. The lasers 12 and 14 generate high energy beams 16 and 18, having the same frequency, which are focused on the array of transmitters 20. The beams 16 and 18 are reflected by the array of transmitters 20, which are positioned adjacent to one another. The array of transmitters 20 reflect the beams as a single cumulative source.

Extracters 30 are positioned to extract a sample of the beams for determining if adjacent transmitters 20 are properly aligned. Ray segments 34, 36, 38 and 40 are extracted from the samples and directed at the extracter 30. The extracter 30 compares and directs the ray segments 34, 36, 38 and 40 to a focal point. Positioned at the focal point is the optical modifier 50. The ray segments 34, 36, 38 and 40 diffract through the optical modifier 50 to the lens 52. As the ray segments 34, 36, 38 and 40 pass through the optical modifier 50 they are converted into output beams 42, 44 and 46 which are directed from the lens 52 to the detectors 56, 58 and 60. As will be discussed herein, output beam 42 is the sum of the zeroth diffracted order from beam sample 38 and the first diffracted order from beam sample 40; output beam 44 is the sum of the first diffracted order from beam sample 38 and the minus first diffracted order from beam sample 36; output beam 46 is the sum of the zeroth diffracted order of beam 36 and the minus first diffracted order of beam sample 34. The beam detectors 56, 58 and 60 interpret the intensity modulations of the output beams 42, 44 and 46 and produce electrical signals indicative of this information and transfers it to the processor 62. The processor 62, as will be discussed below, determines the optical phase difference between the beams 16 and 18.

An analysis of the above is as follows. The ray segments 34, 36, 38 and 40 are directed to the extracting means 30. Generally, ray segments 34 and 36 are generated from a first beam sample, which is generated from a first transmitting means, and ray segments 38 and 40 are generated from a second beam sample, which is generated from a second transmitting means adjacent to the first transmitting means. The ray segments 34, 36, 38, and 40 are directed to the optical modifier 50 which is positioned at the focal point of the extracter 30 and has a periodic transmittance function of the form as follows.

$$T(x,t) = \sin^2[\tfrac{1}{2}(kx+wt+\theta)]$$

where
- x—is the position of the grating
- t—is time
- k—is the spatial frequency of the "sine squared" grating
- w—is the translation velocity
- $\theta$—is a phase shift due to the uncertainty in the grating position at t=0.

This equation takes into account that the image and pupil plane coordinates have been normalized according to laser wavelength and detector Nyquist frequency. The optical modifier 50, preferably a translating grating, rotates at a speed such that from about several to several hundred updates a second may be taken from the modifier 50 for enabling integration of the transmittance function with respect to time. In principle, the rotational speed of the grating does not effect the overall performance of the system. However, the rotational speed of the grating determines how often samples may be taken from the grating. Thus, the more samples taken over a fixed time period the more accurate the transmittance function.

The ray segments 34, 36, 38 and 40 diffract through the optical modifier 50 and are converted to output beams 42, 44, and 46 which, in turn, are directed to the lens 52. The lens 52 directs the parallel output beams 42, 44 and 46 to the detectors 56, 58 and 60. The output beams may generally be characterized as follows. Output beam 42 is the sum of a diffracted order, preferably the zeroth, from the first ray segment 38 of the second beam 18 sample and another diffracted order, preferably the first, from the second ray segment 40 of the second beam 18 sample. Output beam 44 is the sum of a diffracted order, preferably the first, from the first ray segment 38 of the second beam 18 sample and another diffracted order, preferably the minus first, from the second ray segment 36 of the first beam 16 sample. Output beam 46 is the sum of a diffracted order, preferably the zeroth, from the second ray segment 36 of the first beam 16 sample and another diffracted order, preferably the minus first, from the first ray segment 34 of the first beam 16 sample. Generally, the output beams 42, 44 and 46 are directed to detector 56, 58 and 60 respectively. The detectors 56, 58 and 60 measure the intensity modulations of the output beams 42, 44 and 46 and produce first, second and third modulated electrical signals having amplitude and phase components. The irradiance equations of the output beams 42, 44 and 46, which are translated to the processor 32, are as follows:

(Output Beam 42)
$$I(k,t) = 1/16[4A_{40}^2 + A_{38}^2 + 4A_{38}A_{40}\cos(\phi_{40}-\phi_{38}+wt+\theta)]$$

(Output Beam 44)
$$I(0,t) = 1/16[A_{36}^2 + A_{38}^2 + 2A_{36}A_{38}\cos(\phi_{36}-\phi_{38}-2wt-2\theta)]$$

(Output Beam 46)
$$I(-k,t) = 1/16[4A_{34}^2 + A_{36}^2 + 4A_{34}A_{36}\cos(\phi_{34}-\phi_{36}-wt-\theta)]$$

where:
- $A_{34}$ is the amplitude of ray segment 34 at the ray end point
- $A_{36}$ is the amplitude of ray segment 36 at the ray end point
- $A_{38}$ is the amplitude of ray segment 38 at the ray end point
- $A_{40}$ is the amplitude of ray segment 40 at the ray end point
- $\phi_{34}$ is the phase of ray segment 34 at the ray end point
- $\phi_{36}$ is the phase of ray segment 36 at the ray end point
- $\phi_{38}$ is the phase of ray segment 38 at the ray end point
- $\phi_{40}$ is the phase of ray segment 40 at the ray end point
- w is the translation velocity of the grating
- k—is a diffracted order
- t—is time
- $\theta$—is a phase shift due to the uncertainty in the grating position at t=0 Thus, the intensity modulations measured by the detectors 56, 58 and 60 are functions of beam phase, beam amplitude, and the grating phase offset.

The irradiance equations above are utilized by the processor 62, as follows, to determine the phase difference between the beams 16 and 18. The first step of the measurement algorithm is to compute three cosine-weighted sums of the detector intensity as follows:

$$c(k) = \sum_{j=1}^{8} I\left(k, \frac{j\pi}{4w}\right) \cos\left(\frac{j\pi}{4}\right)$$

$$c(0) = \sum_{j=1}^{8} I\left(0, \frac{j\pi}{4w}\right) \cos\left(\frac{j\pi}{4}\right)$$

$$c(-k) = \sum_{j=1}^{8} I\left(-k, \frac{j\pi}{4w}\right) \cos\left(\frac{j\pi}{4}\right)$$

where
w—is the translation velocity of the grating Next three sine-weighted sums of the detector intensity is computed as follows.

$$s(k) = \sum_{j=1}^{8} I\left(k, \frac{j\pi}{4w}\right) \sin\left(\frac{j\pi}{4}\right)$$

$$s(0) = \sum_{j=1}^{8} I\left(0, \frac{j\pi}{4w}\right) \sin\left(\frac{j\pi}{4}\right)$$

$$s(-k) = \sum_{j=1}^{8} I\left(-k, \frac{j\pi}{4w}\right) \sin\left(\frac{j\pi}{4}\right)$$

c(0) and the other 5 remaining sums may be represented in the following form.

$$C(0) = \tfrac{1}{2} A_{36} A_{38} \cos(\phi_{36} - \phi_{38} - 2\theta)$$

Thus the phase difference is given as $$\phi = \text{TAN}^{-1}[S(0)/C(0)] - \{\text{TAN}^{-1}[S(-k)/C(-k)] + \text{TAN}^{-1}[S(k)/C(k)]\}$$

$$\phi = (\phi_{38} - \phi_{36} - 2\theta) - [(\phi_{40} - \phi_{38} - \theta) + (\phi_{36} - \phi_{34} - \theta)]$$

$$\phi = (\phi_{38} - \phi_{36}) - [(\phi_{40} - \phi_{38}) + (\phi_{36} - \phi_{34})]$$

where $\phi$ is the phase difference between two laser beam 16 and 18 and 116 and 118 relative to the average direction of beam propagation.

As the calculations are performed the amplitude of the beam samples and the grating phase effects are cancelled out and eliminated. Also, the detector gain variations, which are equivalent to amplitude variations, have no effect on the accuracy of the optical phase difference. Further, because the sine and cosine weights have a zero means, detector biases or uniform backgrounds have no effect on the accuracy of the optical phase difference.

The determination of the phase difference between adjacent transmitters 20 enables the transmitters 20 to be adjusted so that the array of transmitters function as a single unit. Thus, the beams generated from the array act as if they were a single beam yielding maximum intensity at the target.

Figure 4:
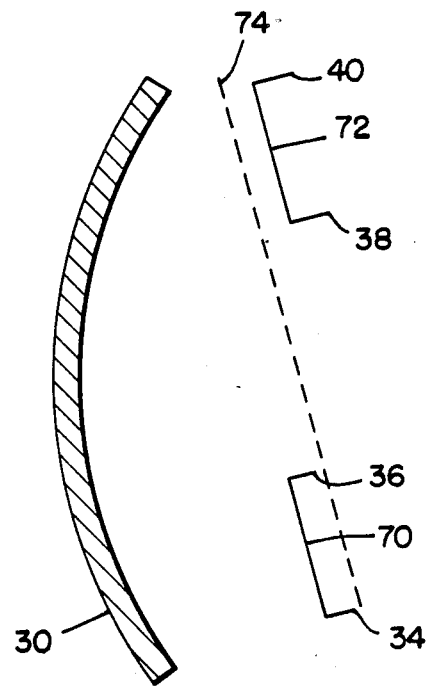
FIG. 4 is an enlarged view of the extracter of FIG. 1.

Ray segments 34, 36, 38 and 40 are directed to the extracter 30 and wave fronts associated with them designated as line 70 and 72 (best seen in FIG. 4). Line or beam front 70 represents the average direction of propagation of ray segments 34 and 36 and line or beam front 72 represents the average direction of propagation of ray segments 38 and 40. The ray segments 34, 36, 38 and 40 are directed from the extracter 30 to the optical modifier 50. The optical modifier 50 generates the output beams 42, 44 and 46 which are directed to detectors 56, 58 and 60. The detector 56 receives output beam 42 which has phase and amplitude information on ray segments 38 and 40. The detector 58 receives output beam 44 which has phase and amplitude information on ray segments 36 and 38. The detector 60 receives output beam 46 which has phase and amplitude information on ray segments 34 and 36. Preferably, the sum of the difference in phase between ray segments 34 and 36 and the sum of the difference in phase between ray segments 38 and 40 is equal to the difference in phase between 36 and 38. Thus, the deviation between the above phase differences equality expresses the phase difference ($\phi$) as determined herein. The information from ray segments 34, 36, 38 and 40 is determined as described herein. Also, the phase difference is determined as described herein. Thus, the information enables the transmitters 20 to be adjusted so that the beam fronts 70 and 72 are in phase as shown by beam front 74 (in phantom).

The transfer function of the optical modifier enables the system to interpret sample beams which have a relatively straight propagated wave front or beams which have a relatively tilted or angled propagated wave front (as seen in FIG. 4). This interpretation enables the array of transmitters to be adjusted to produce a single beam regardless of the angle of the wave front of the sample beams received.

The processor 62 generally determines the phase difference as indicated above. The processor 62 generally utilizes three eight bucket correlators 64, 66, 68 to perform the summations of the weighted-cosine and sine functions. However, any generic processor may be used which is capable of calculating the identified functions.

The invention provides for many variations and modifications of the illustrated embodiments. On a system level, the dimensioning and dynamic range of the sensor can be adjusted according to the nature of the laser and the relationship of the sensor to the laser. The sensor can be arranged to measure the entire beam, or a sample. The sensor can be arranged to calibrate the beam as it exits the laser or to evaluate the beam at its destination to compensate for intervening sources of distortion, such as atmospheric anomalies.

As indicated, other transmittance functions can be applied with appropriate algorithms. The transmittance functions need not be in rectangular coordinates.

The various focusing and collimating elements can be implemented in a variety of ways. Similarly, there is a wide variety of intensity detectors available that can be incorporated by the present invention. The processor is also a generic component. In a carefully calibrated system, some of the processor functions can be implemented by analog components prior to digital conversion.

In accordance with the foregoing, an improved system for determining the optical path difference of a laser beam is presented. As indicated, many modifications and variations are within this invention's scope, which is limited only by the following claims.

We claim:

1. A shearing phase difference sensor for a high energy laser source which generates mutually adjacent light coherent beams comprising:
   optical modifying means having a transmittance which varies mathematically in a periodic fashion and as a square of a trigonometric function of displacement along a surface transverse to a direction of rays of light propagating via said modifying means,
   means for extracting a sample from each adjacent coherent beam, said extracting means being positioned such that said extracted sample is directed to said optical modifying means,
   lens means, said optical modifying means diffracting said sample beams to produce a diffraction pattern which provides at least one output beam, said optical modifying means being positioned so that said output beam is directed to said lens means,
   detector means, said lens means positioned to intercept said output beam and to direct said output beam to said detector means, said detector means being positioned to receive said output beam from said lens means, said detector means producing at least one electric signal indicative of said output beam, and
   processor means responsive to said electrical signals for determining a phase difference between said adjacent coherent sample beams.

2. The shearing phase difference sensor according to claim 1 wherein said optical modifying means comprises a translating grating.

3. The shearing phase difference sensor according to claim 2 wherein said translating grating rotates at a predetermined velocity.

4. A shearing phase difference sensor for a high energy laser source which generates mutually adjacent light coherent beams comprising:

optical modifying means, and means for extracting a sample from each adjacent coherent beam, said extracting means being positioned such that said extracted sample is directed to said optical modifying means, lens means, said optical modifying means diffracting said sample beams to produce a diffraction pattern which provides at least one output beam, said optical modifying means being positioned so that said output beam is directed to said lens means, detector means, said lens means positioned to intercept said output beam and to direct said output beam to said detector means, said detector means being positioned to receive said output beam from said lens means, said detector means producing at least one electric signal indicative of said output beam, and processor means responsive to said electrical signals for determining a phase difference between said adjacent coherent sample beams, and wherein said optical modifying means comprises a translating grating which rotates at a predetermined velocity, said rotating translating grating having a transfer function (T) of the form:

$$T(x,t) = \sin^2[\frac{1}{2}(kx+wt+\theta)]$$

wherein -x- is the position of the grating
-t- is time
-k- is the spatial frequency of the grating
-w- is the translation velocity
-$\theta$- is a phase shift due to an uncertainty in the grating position at t=0.

5. The shearing phase difference sensor according to claim 4 wherein three output beams are produced by said grating.

6. The shearing phase difference sensor according to claim 5 wherein said lens means comprises a collimating lens.

7. The shearing phase difference sensor according to claim 5 wherein said detector means comprises three detectors each detector positioned to intercept one of said three output beam.

8. The shearing phase difference sensor according to claim 7 wherein said detectors produce three electric signals.

9. The shearing phase difference sensor according to claim 8 wherein said electric signals are of the form:

$$I(k,t) = 1/16[4A_{40}^2 + A_{38}^2 + 4A_{38}A_{40}\cos(\phi_{40}-\phi_{38}+wt+\theta)]$$

$$I(0,t) = 1/16[A_{36}^2 + A_{38}^2 + 2A_{36}A_{38}\cos(\phi_{36}-\phi_{38}-2wt-2\theta)]$$

$$I(-k,t) = 1/16[4A_{34}^2 + A_{36}^2 + 4A_{34}A_{36}\cos(\phi_{34}-\phi_{36}-wt-\theta)]$$

where A is the amplitude of the first and second ray segments of said first and second samples
$A_{34}$—is the amplitude of said first ray segment first sample
$A_{36}$—is the amplitude of said second ray segment first sample
$A_{38}$—is the amplitude of said first ray segment second sample
$A_{40}$—is the amplitude of said second ray segment second sample $\theta$—is a phase shift due to the uncertainty in the grating position at to=0
$\phi_{34}$—is the phase of said first ray segment first sample
$\phi_{36}$—is the phase of said second ray segment first sample
$\phi_{38}$—is the phase of said first ray segment second sample
$\phi_{40}$—is the phase of said second ray segment first sample
w—translation velocity
t—is time.

10. The shearing phase difference sensor according to claim 9 wherein said processor integrates and sums the electric signals in determining the phase difference.

11. A method of determining a phase difference between adjacent coherent light beams having the same frequency, comprising the steps of:

(a) extracting a sample from each adjacent coherent light beam; each sample having a first ray segment and a second ray segment, (b) optically modifying each of said ray segments, from said two adjacent beam samples, to produce a diffraction pattern which provides first, second, and third output beams, said first output beam being the sum of a given diffracted order from said first ray segment for said second beam sample and another diffracted order from said second ray segment of said second beam sample, said second output beam being the sum of a given diffracted order from said first ray segment of said second beam sample and another diffracted order from said second ray segment of said first beam sample, said third output beam being the sum of a given diffracted order from said second ray segment of said first beam sample and another diffracted order from said first ray segment of said first beam sample, (c) positioning first, second and third detector means to receive said first, second and third output beams, (d) detecting said output beams to produce first, second and third modulated electrical signals having amplitude and phase components, (e) extracting the phase components from said first, second, and third electrical signals to produce first, second, and third phase signals, (f) combining said phase signals to determine the shearing phase difference between said first and second adjacent beams.

12. The method according to claim 11 wherein said optical modifying further comprises the step of rotating a translating grating at a predetermined translation velocity.

13. The method according to claim 12, wherein said grating has a transfer function (T) of the form:

$$T(x,t) = \sin^2[\frac{1}{2}(kx+wt+\theta)]$$

wherein -x- is the position of the grating
-t- is time
-k- is the spatial frequency of the grating
-w- is the translation velocity
-$\theta$- is a phase shift due to an uncertainty in the grating position at t=0.

14. The method according to claim 11 wherein said first, second and third modulated electrical signals are in the form of intensity modulations.

15. The method according to claim 14 wherein said intensity modulations have a transfer function of the form:

$$I(k,t) = 1/16[4A_{40}^2 + A_{38}^2 + 4A_{38}A_{40} \cos(\phi_{40} - \phi_{38} + wt + \theta)]$$

$$I(0,t) = 1/16[A_{36}^2 + A_{38}^2 + 2A_{36}A_{38} \cos(\phi_{36} - \phi_{38} - 2wt + \theta)]$$

$$I(-k,t) = 1/16[4A_{34}^2 + A_{36}^2 + 4A_{34}A_{36} \cos(\phi_{34} - \phi_{36} - wt - \theta)]$$

where A is the amplitude of the first and second ray segments of said first and second samples $A_{34}$—is the amplitude of said first ray segment first sample $A_{36}$—is the amplitude of said second ray segment first sample $A_{38}$—is the amplitude of said first ray segment second sample $A_{40}$—is the amplitude of said second ray segment second sample $\theta$—is a phase shift due to the uncertainty in the grating position at to=0

$\phi_{34}$—is the phase of said first ray segment first sample $\phi_{36}$—is the phase of said second ray segment first sample $\phi_{38}$—is the phase of said first ray segment second sample $\phi_{40}$—is the phase of said second ray segment first sample w—translation velocity t—is time.

16. A method of determining phase difference between adjacent coherent light beams having the same frequency, comprising the steps of;

(a) extracting a sample from each adjacent coherent light beam, each sample having a first ray segment and a second ray segment, (b) directing said first and second beam samples to a rotating translating grating to produce a diffraction pattern which provides first, second, and third output beams;

said first output beam being the sum of a (one) diffracted order from said first ray segment of said second beam sample and another diffracted order from said second ray segment of said second beam sample, said second output beam being the sum of a diffracted order from said first ray segment of said second beam sample and another diffracted order from said second ray segment of said first beam sample, said third output beam being the sum of a diffracted order from said second ray segment of said first beam sample and another diffracted order from said first ray segment of said first beam sample (c) positioning first, second, and third detector means to receive said first, second, and third output beams, (d) detecting said output beams to produce first, second and third modulated electrical signals having amplitude and phase components, (e) extracting the phase components from said first, second, and third electrical signals to produce first, second, and third phase signals, (f) combining said phase signals to determine the phase difference between said first and second adjacent beams.

17. The method of claim 16 wherein said first output beam's given diffracted order is the zeroth order and said another diffracted order is the first order.

18. The method of claim 16 wherein said second output beam's given diffracted order is the first order and said another diffracted order is the minus first order.

19. The method of claim 16 wherein said third output beam's given diffracted order is the zeroth order and said another diffracted order is the minus first order.

* * * * *